United States Patent Office 3,258,727
Patented June 28, 1966

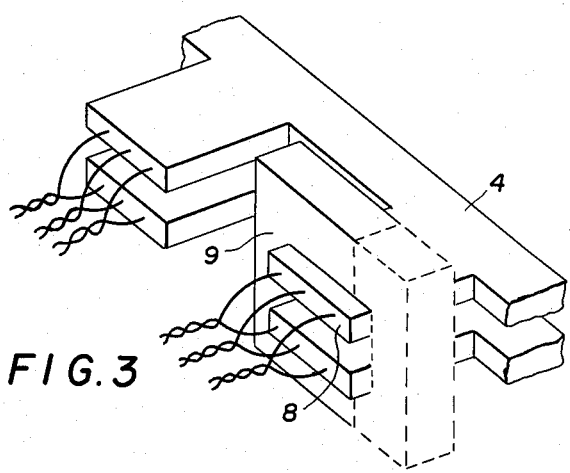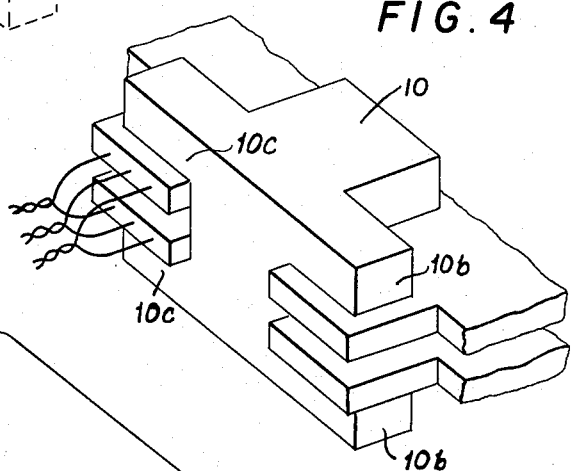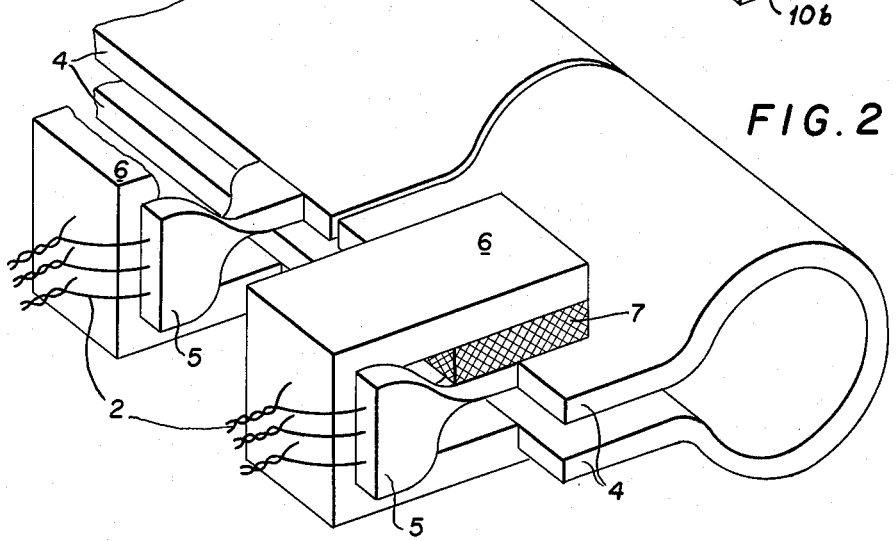

3,258,727
CONNECTOR FOR HIGH-CURRENT LOAD DEVICE
Rudolf Weinsheimer, Ludwigshafen, Hans-Josef Mürtz, Lampertheim, Herbert Winkenbach, Ludwigshafen, Hermann Fay, Aachen, and Willibald Anger, Julich, Germany, assignors to Brown, Boveri & Cie., Aktiengesellschaft, Mannheim-Kafertal, Germany, a corporation of Germany
Filed Sept. 18, 1963, Ser. No. 309,706
Claims priority, application Germany, Sept. 18, 1962, B 68,885
7 Claims. (Cl. 336—192)

Our invention relates to high-current or shock-current generating systems wherein a substantially induction-free connection simultaneously supplies current from many individual current sources to a high-current load, preferably an inductive load of the coil type, and more particularly to the load and the induction-free connection. The invention is described hereinafter with reference to the accompanying drawings in which:

FIG. 2 is a perspective view partly broken away of bracing units including clamping structures for the bus bars of coil load members embodying features of our invention; and FIGS. 3 and 4 are perspective views of other bracing units that embody features of the invention.

Figure 1:
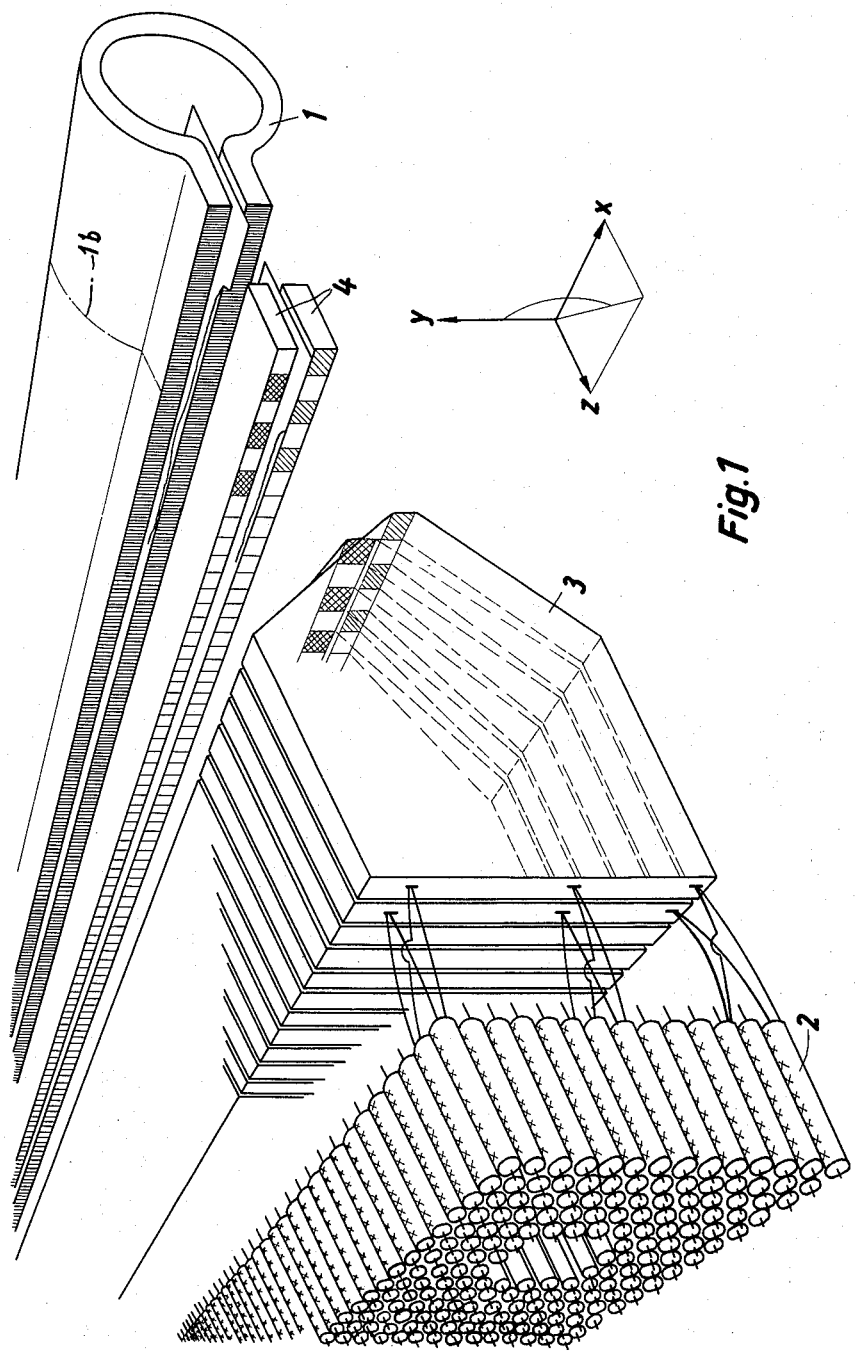
FIG. 1 is an exploded perspective view of the low-induction connection and the load coil of a high-current generating system.

Some electrical systems, such as those employed in the fields of plasma physics, utilize extremely high current intensities. These currents are applied as surges from energy storers, such as capacitors, to a load usually consisting of a single-turn coil. To attain extremely high current peaks at particular switching moments, the inductive impedances of the high-current conductors and bus conductors must be as low as possible because these inductances alone substantially determine the peak current. This, as is known, can be accomplished by employing current-supply conductors in form of coaxial cables. Such coaxial cables have been used as connections between a multiplicity of capacitors or capacitor batteries, generally constituting a current source, and the load or a collector device immediately ahead of the load.

A collector is a device which offers space for attaching the numerous individual cables and which supplies the high-intensity current on a low inductance path to the load coil. Such a collector is necessary because the load coil normally is too small spatially to receive directly the numerous individual cables coming from the batteries. The flow of electrical energy through such a collector involves an extremely high increase in energy density.

In such a collector, the above-mentioned extremely-low line inductance is of utmost importance. However, mechanical strength must also be considered because the high current intensities result in high mechanical forces being imposed upon the individual conductor parts, and such forces may damage or cause explosion of the components. The design of a collector between the predominantly inductive load and the capacitive energy storage devices, must also consider that the entire system is capable of oscillation. While the discharge is being released, a damped oscillation occurs at a frequency of several thousand cycles per second. This relatively high frequency, in conjunction with the extremely high current intensity results in an intense skin effect. The massive conductor parts thus conduct nearly the full current within a rather thin surface zone. At localities where the current-flow direction changes, particularly at connection points where the conductors are necessarily bent or twisted, the skin effect tends to cause excessively high current densities. Such narrowly limited spots become hot often to the point of melting, particularly at junction locations.

For further explanation, FIG. 1 of the accompanying drawings shows schematically a conductor arrangement for extreme-intensity current surges or shock currents, particularly for producing a plasma. A load coil 1 of elongated shape having but a single turn is to be energized from a capacitor bank (not illustrated) through triggered spark gaps (not illustrated). For connecting the numerous capacitors to the coil 1, a great number of coaxial cables 2 are provided. Since the dimensions of the coil 1 are too small for connecting many cables thereto directly, this function is accomplished by an intermediate collector 3 composed of a stack of mutually insulated conductor plates. The plates have a tapering end connected with one of two respective bus bars 4 which, although shown separate from the coil 1, are mechanically and electrically joined with the coil along the respective two terminal edges of the single turn. The opposite edge of each collector plate is wide enough to permit conveniently attaching a number of coaxial cables 2. The collector plates have alternately opposite polarities in accordance with the respectively different polarities of the two bus bars 4. Accordingly, for example, the outer conductors of the first two vertical rows of coaxial cables 2 are all electrically connected to the one collector plate 3 located in front of the illustrated assembly, and the inner conductors of the same two rows of cables are all connected to the next following collector plate and so forth.

Referring to high-current and particularly shock-current load coils of the above-mentioned kind, it is an object of our invention to reliably prevent in a simple and economical manner damage due to excessive mechanical forces which are apt to occur under the effect of the high momentary shock currents that tend to explode the coil-type load structure.

Another and subsidiary object of the invention is to devise a force-restraining bracing device for the just-mentioned purpose which permits the entire arrangement of current-supply conductors, including the bracing means, to be longitudinally subdivided into replacable units or modules having the same design and the same properties among themselves. A further, more specific object is to provide the entire arrangement with a longitudinal subdivision that also includes a corresponding subdivision of the load coil, so that each coil portion forms part of a modular unit.

Still another object of the invention is to provide a force-restraining or bracing device of the above-mentioned type which occupies only little space along only one side of the coil, thus leaving ample space near the load coil available for observation and servicing.

It is also an object of the invention, akin to those mentioned, to provide a bracing device that does not weaken the cross sections which, as explained above, are highly stressed electrically or mechanically in the operation of the equipment, and it is also an aim of the invention to secure a slight and therefore negligible inherent inductivity of the bracing device as well as to produce the bracing device in a simple and inexpensive manner.

To achieve these objects, and in accordance with a feature of the invention, we provide a high-current load device of elongated and tubular inductance type having two bus bars which extend longitudinally along an elongated tubular member for connection to a multiplicity of individual current sources by means of coaxial or other inductance-poor cables. Also provided are a number of longitudinally distributed bracing or clamping devices for reinforcing the load member against mechanical forces caused by the electric currents, each of the clamping devices being formed substantially by a U-shaped structure which, directly and/or through insulating inserts, is in force-constrained engagement with the two bus bars, and is so placed upon the bus bars that the direction of engagement and the general current-supply direction are parallel. That is, the U-shaped clamping structure is attachable to, or removable from, the two bus bars from one side of the load member in a substantially radial direction, so that the two legs of the U-shaped structure straddle the two bus bars between each other.

According to another feature of our invention, the clamping device and the means for connecting the cable conductors to the bus bar, the latter means being located at the respective clamping devices, constitute an interchangeable structural unit or module, if desired, together with a corresponding longitudinal portion of the load member.

The foregoing and more specific objects, advantages and features of our invention, said features being set forth with particularity in the claims annexed hereto, will be apparent from the embodiments of the invention illustrated by way of example in FIGS. 2, 3, 4 and presently described.

In FIGS. 3 and 4, the load member, consisting of a single-turn coil according to FIGS. 1 and 2, is not illustrated, only the appertaining bus bars 4 being shown.

In the substantially similar embodiments of FIG. 2, the distributor 3 of FIG. 1 is substituted by a clamping device according to the invention which also serves the above-mentioned purpose of bracing the bus bars 4 and consequently the load member against widening or explosive forces caused by the extreme current intensities. The supply of current to the bus bars 4 from a multiplicity of current sources, such as capacitors, is effected by inductance-poor cables, preferably coaxial cables, which are schematically shown in FIG. 2 as twisted pairs 2. For connecting one of the conductors of each cable line to the upper bus bar 4, this bus bar is provided for each clamping device with a contact piece 5 of generally angular shape, integral therewith as shown in the embodiment on the right-hand side of FIG. 2 or electrically connected thereto by welding or the like as shown in the embodiment on the left-hand side of the same figure. One arm of the angle is in contact with the upper bus bar 4. The other arm extends at a right angle away from the upper bus bar and is twisted 90°. The outer end portion of the twisted arm is widened and thus provides a vertically elongated front face to which a number of cable conductors can be attached as is schematically indicated in FIG. 2. The lower bus bar 4 is in contact with one leg of a U-shaped clamping structure 6 of electrically conductive material such as steel or silver-plated steel, for example. The two legs of this structure straddle the two bus bars 4 between each other, but the upper leg is insulated from the upper bus bar by an interposed layer 7 of insulation. The clamping structure 6 is rigid to prevent the two bus bars from being moved apart from each other by forces caused by the electric current flow, thus preventing the single turn of the load member from being bent open. The structure 6 simultaneously serves as a conductor or distributor member for supplying current to the lower bus bar 4. The front face of its bight portion offers for this purpose a relatively large area to which a number of cable conductors can be attached. The direction of the force-constraining engagement between the clamp structure 6 and the two bus bars 4 is parallel to the general direction in which the current is supplied to the bus bars and hence to the load member. That is, the clamp structure 6 is insertable and removable in a direction which is generally radial to the axis of the load member and bus bars, in contrast to devices in which clamping is effected transverse to the direction of the current-supply path. This is of advantage not only with respect to the smaller space requirements of devices according to the invention in the longitudinal direction where space is at a premium, but also with respect to the required low inductivity of the current supply.

By virtue of the outwardly widening shape of the connecting piece 5, in conjunction with the simultaneous utilization of the bracing clamp 6 for the supply of current, the space available for the connection of numerous coaxial cables or similar supply conductors is considerably increased. The narrow design of the clamping structure and the widened connector portion 5 extending parallel to the clamp contribute to greatly minimizing undesired magnetic fields and thus securing a low inherent inductivity. That is why it is desirable to give the connecting piece 5 the above-described 90° twisted shape which permits widening of the available connecting area 5b in a direction transverse to the coil axis of the load member as sufficient space for this purpose is made available in this direction.

The units of the load device illustrated in FIG. 2 are proportioned for the full force occurring therein, a force which occurs repeatedly in uniform distribution along the entire load coil. By thus subdividing the electrical connecting and mechanical bracing means into a number of individual units, the load equipment can be given any desired size or rating simply by serially mounting a desired number of such modular units together. This is particularly the case if the load coil 1 is correspondingly subdivided into a number of portions as shown in FIG. 2 and schematically indicated in FIG. 1 by a division line 1b. Each individual unit or module then comprises a portion of the load coil together with the necessary mechanical bracing and electrical connecting means, and thus constitutes a completely self-sufficient unit that can be used in combination with any number of other units to jointly form a load device of any desired size or current rating.

In the embodiment shown in FIG. 3, the two bus bars 4 are provided with lateral lugs 8 which are uniformly distributed longitudinally so that one lug of each bar is assigned to each subdivisional region to be equipped with cable-connecting and clamping means. The lugs extend from the main body of each bus bar in a direction away from the load coil. Each two lugs 8 of the respective bus bars are located above each other and are straddled by an electrically conductive ring-shaped clamping structure 9 of material similar to that of the clamping structure 6 for restraining mechanical forces. In lieu of the single ring-shaped clamp, one or two U-shaped clamps may be provided, since the ring-shaped clamp is essentially a duplication of a U shape.

The clamp structures are preferably insulated from the adjacent lug 8 or connector portion of piece 5 by insulating inserts. It is to be noted, however, that due to the skin effect only the mutually facing surfaces of the connecting portions on pieces 5 carry the current. Consequently, the opposite surfaces which face the clamping structure need not necessarily be insulated. That is, due to skin effect, a short-circuiting of the coil current through the ring-shaped clamping structure 9 would not occur. It is necessary, however, to provide sufficient spacing between the front face 5b of each connecting portion of the angle piece 5 and the clamping structure, because at this location the current-conducting skin layer is adjacent to the clamping structure.

In the embodiment shown in FIG. 4, a U-shaped clamp 10 of steel or silver-plated steel, for example, has legs placed in straddling and force-restraining engagement with the two intermediately located bus bars 4 so that in this respect the embodiment corresponds to that of FIG. 2. However, the bus bars according to FIG. 4 are also provided with lateral lugs 8 as in the embodiment of FIG. 3, and each of the two legs of the clamp structure 10 has lateral extensions 10b and 10c which protrude longitudinally over the adjacent pair of lugs 8 and thus perform the function of a clamping device as shown in FIG. 3. The clamp structure 10 as shown in FIG. 4 is slipped from the left toward the right onto the two bus bars 4 in the same manner as the clamp structures according to the other embodiments. FIG. 4 shows a number of cable conductors attached to the lugs 8, but they may also be connected to the buses in the manner described with reference to FIGS. 2 and 3.

To those skilled in the art it will be obvious upon a study of this disclosure that our invention permits of various modifications and can be given embodiments other than particularly illustrated and described herein, without departing from the essential features of our invention and within the scope of the claims annexed hereto.

We claim:

1. In a high-current load device having an elongated and substantially tubular load-coil member with two bus bars extending along the member to supply longitudinally distributed current thereto, a connector device comprising in combination a plurality of exchangeable bracing units each comprising a generally U-shaped clamp structure having two legs straddling said two bus bars in force-restraining engagement therewith so as to brace said load member against mechanical forces due to the flow of current, said clamp structure and said bus bars being secured to one another solely by frictional force, said legs being engageable with said bus bars in a direction substantially parallel to that of the flow of current to said load member, so that each bracing unit is attachable to and removable from said bus bars along one side of said load member in a direction radially toward and away respectively from said load member, and means for supplying current to said bus bars at the respective locations of said units, said supply means extending along said one side and substantially in said radial direction at said units.

2. In a high-current load device having an elongated and substantially tubular load-coil member with two bus bars extending along the member to supply longitudinally distributed current thereto, a connector device for attaching a multiplicity of current supply cables to said bus bars, said device comprising in combination a generally U-shaped clamp structure having two legs straddling said two bus bars in force-restraining engagement therewith so as to brace said load member against mechanical forces due to the flow of current, said clamp structure and said bus bars being secured to one another solely by frictional force, said legs being engageable with said bus bars in a direction substantially parallel to that of the flow of current to said load member, one of said legs being insulated from the one bus bar engaged thereby, the other leg being in electric contact with said other bus bar, means for connecting cable conductors of one polarity to said one bus bar, and said clamp structure forming a connector for cable conductors of the other polarity.

3. In a connector device according to claim 2, said clamp structure having between said two legs a bight portion spaced from said load member in a substantially radial location, and said cable conductors of said other polarity being attached to said bight portion.

4. In a connector device according to claim 3, said connecting means comprising a rigid connector piece of angular shape having one arm in contact with said one bus bar and located between the two legs of said U-shaped structure and having the other arm extend outside of the leg interspace of said structure and in spaced and insulated relation to said structure, said other arm having a widened end portion for attachment of said cable conductors of the other polarity.

5. In a connector device according to claim 1, each of said two bus bars having longitudinally spaced lug portions for connection with said current-supply means, each of said lug portions protruding from the bar in a direction away from the load member at the same longitudinal location as the corresponding lug portion of the other bus bar, and said two lug portions of said respective bus bar being force-constrainedly engaged by one of said respective clamp structures.

6. In a connector device according to claim 5, said clamp structures forming a double U shape so as to surround said two lug portions.

7. In a connector device according to claim 1, each of said two bus bars having longitudinally spaced lug portions, for connection with said current-supply means, each of said lug portions protruding from the bar in the direction away from the load member at the same longitudinal location as the corresponding lug portion of the other bus bar, and the legs of said clamp structure having respective lateral extensions in the longitudinal direction of said bus bars, said extensions straddling said two lug portions.

References Cited by the Examiner
UNITED STATES PATENTS

| | | | |
|---|---|---|---|
| 508,620 | 11/1893 | Johnson et al. | 336—192 |
| 2,474,395 | 6/1949 | Early et al. | 336—192 X |
| 2,873,432 | 2/1959 | Glassanos | 336—192 |

ROBERT K. SCHAEFER, *Primary Examiner.*

JOHN F. BURNS, *Examiner.*

T. J. KOZMA, *Assistant Examiner.*